US012330580B1

United States Patent
Deng et al.

(10) Patent No.: US 12,330,580 B1
(45) Date of Patent: Jun. 17, 2025

(54) AIRBAG SIZE BASED ON SEAT RECLINE

(71) Applicant: Ford Global Technologies, LLC, Dearborn, MI (US)

(72) Inventors: Zhibing Deng, Northville, MI (US); Deepak Patel, Canton, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/746,448

(22) Filed: Jun. 18, 2024

(51) Int. Cl.
| | |
|---|---|
| *B60R 21/2338* | (2011.01) |
| *B60N 2/20* | (2006.01) |
| *B60R 21/013* | (2006.01) |
| *B60R 21/207* | (2006.01) |
| *B60R 21/237* | (2006.01) |
| *B60R 21/00* | (2006.01) |
| *B60R 21/01* | (2006.01) |
| *B60R 21/231* | (2011.01) |

(52) U.S. Cl.
CPC ............ *B60R 21/2338* (2013.01); *B60N 2/20* (2013.01); *B60R 21/013* (2013.01); *B60R 21/207* (2013.01); *B60R 21/237* (2013.01); *B60R 2021/0034* (2013.01); *B60R 2021/01211* (2013.01); *B60R 2021/01225* (2013.01); *B60R 2021/01238* (2013.01); *B60R 2021/23146* (2013.01); *B60R 2021/23384* (2013.01)

(58) Field of Classification Search
CPC . B60R 21/2338; B60R 21/207; B60R 21/013; B60R 21/237; B60R 21/23138; B60R 2021/23384; B60R 2021/23382; B60R 2021/01211; B60R 2021/01225; B60R 2021/01238; B60R 2021/23146; B60R 2021/0034; B60N 2/20; B60N 2/22; B60N 2/3004; B60N 2/3009; B60N 2/3011
USPC .............................................. 280/730.2, 743.2
See application file for complete search history.

(56) References Cited

U.S. PATENT DOCUMENTS

| | | | |
|---|---|---|---|
| 9,682,681 B1 * | 6/2017 | Patel | ................. B60R 21/23138 |
| 10,632,958 B2 | 4/2020 | Dry et al. | |
| 11,180,102 B1 | 11/2021 | Jaradi et al. | |
| 11,208,068 B2 * | 12/2021 | Kim | ................. B60R 21/23138 |

(Continued)

FOREIGN PATENT DOCUMENTS

| | | | |
|---|---|---|---|
| JP | 2006290258 A | * | 10/2006 |
| JP | 2008201297 A | * | 9/2008 |
| KR | 20240006217 A | * | 1/2024 |

OTHER PUBLICATIONS

Pelky, "Air Bags 201", Ceu Webinars: Technical Education, Jun. 20, 2023; https://www.youtube.com/watch?v=h10qh39-R8Q.

(Continued)

*Primary Examiner* — Keith J Frisby
(74) *Attorney, Agent, or Firm* — Frank A. MacKenzie; Brooks Kushman P.C.

(57) ABSTRACT

A system includes a seat moveable between an upright position and a reclined position, and an airbag module mounted to the seat. The airbag module includes an airbag inflator, an airbag, and a panel attached to a folded portion of the airbag. A tether is coupled to the folded portion via the panel, the tether being retracted relative to the airbag module when the seat is in the upright position and extended when the seat is in the reclined position.

20 Claims, 6 Drawing Sheets

(56) References Cited

U.S. PATENT DOCUMENTS

| | | |
|---|---|---|
| 11,254,245 B2 | 2/2022 | Epaud et al. |
| 11,260,818 B2 | 3/2022 | Iida et al. |
| 11,260,820 B1 | 3/2022 | Patel et al. |
| 11,383,666 B2 | 7/2022 | Yoo et al. |
| 11,590,920 B2 | 2/2023 | Schneider et al. |
| 11,938,887 B2 * | 3/2024 | Saito .................... B60R 21/207 |
| 12,194,947 B2 * | 1/2025 | Kudou .................. B60R 21/207 |
| 2007/0024033 A1 * | 2/2007 | Suzuki ................ B60R 21/2338 |
| | | 280/730.2 |
| 2019/0111884 A1 * | 4/2019 | Kobayashi .......... B60R 21/2338 |
| 2019/0118759 A1 * | 4/2019 | Kobayashi ............ B60R 21/235 |
| 2020/0114855 A1 * | 4/2020 | Deng .................... B60R 21/207 |
| 2020/0307484 A1 * | 10/2020 | Adler ................. B60R 21/2338 |

OTHER PUBLICATIONS

Jadhav et al., "Folded Pelvis-Thorax Side Airbag Modeling with CFD Approach and Implementation in Full Vehicle Crash Analysis", Published Mar. 28, 2017, ISSN 0148-7191, http://papers.sae.org/2017-01-1460.

* cited by examiner

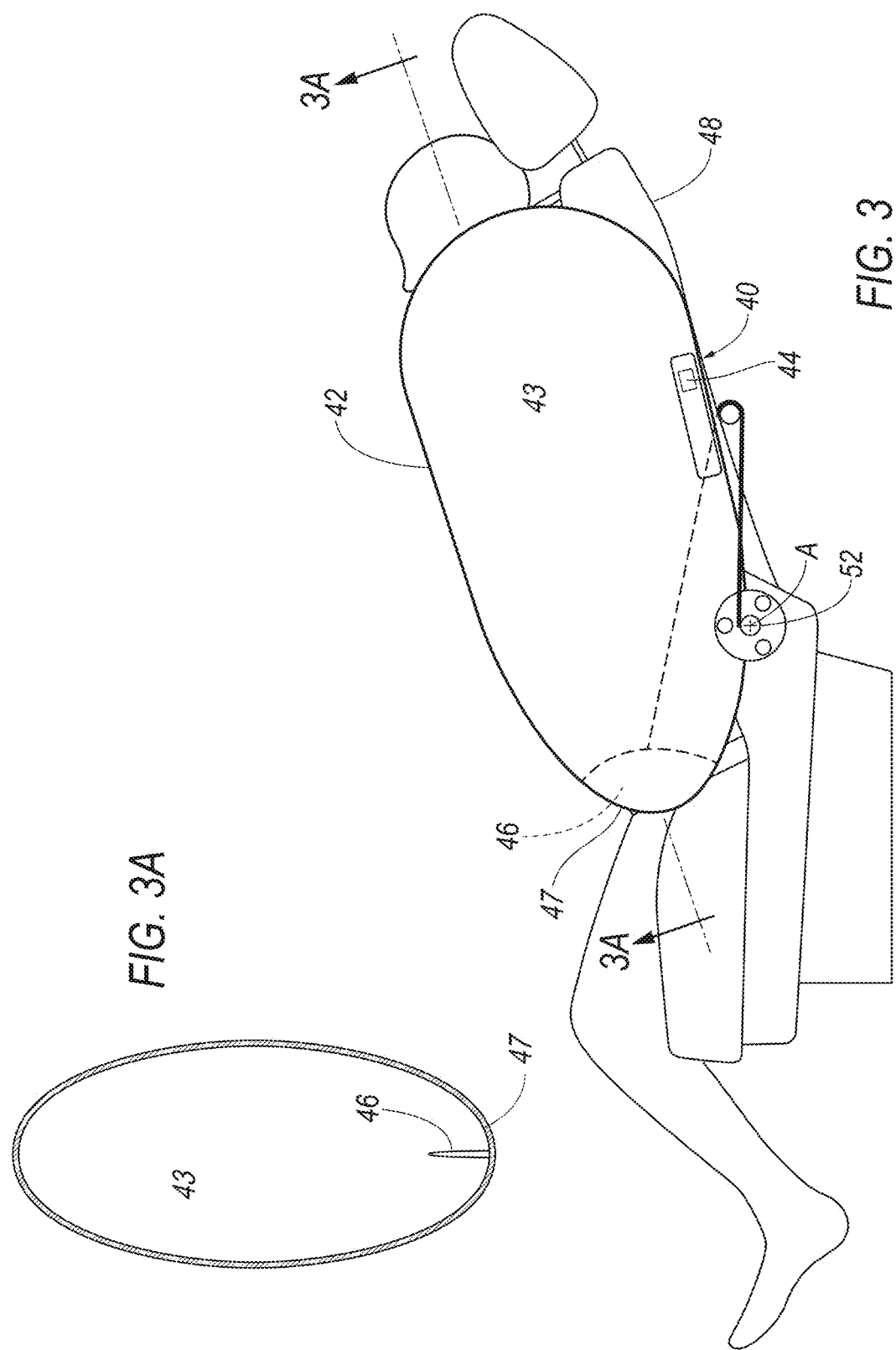

AIRBAG SIZE BASED ON SEAT RECLINE

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in the passenger compartment of the vehicle. Vehicles may include airbags supported on a dash, side air curtains, seat-mounted airbags, etc.

BRIEF DESCRIPTION OF THE DRAWINGS

FIG. 3 is a side view of the system with the seat in a reclined position and the airbag in a second inflated configuration.

FIG. 3A is a cross-sectional view of the airbag taken along line 3A in FIG. 3.

DETAILED DESCRIPTION

Figure 1A:
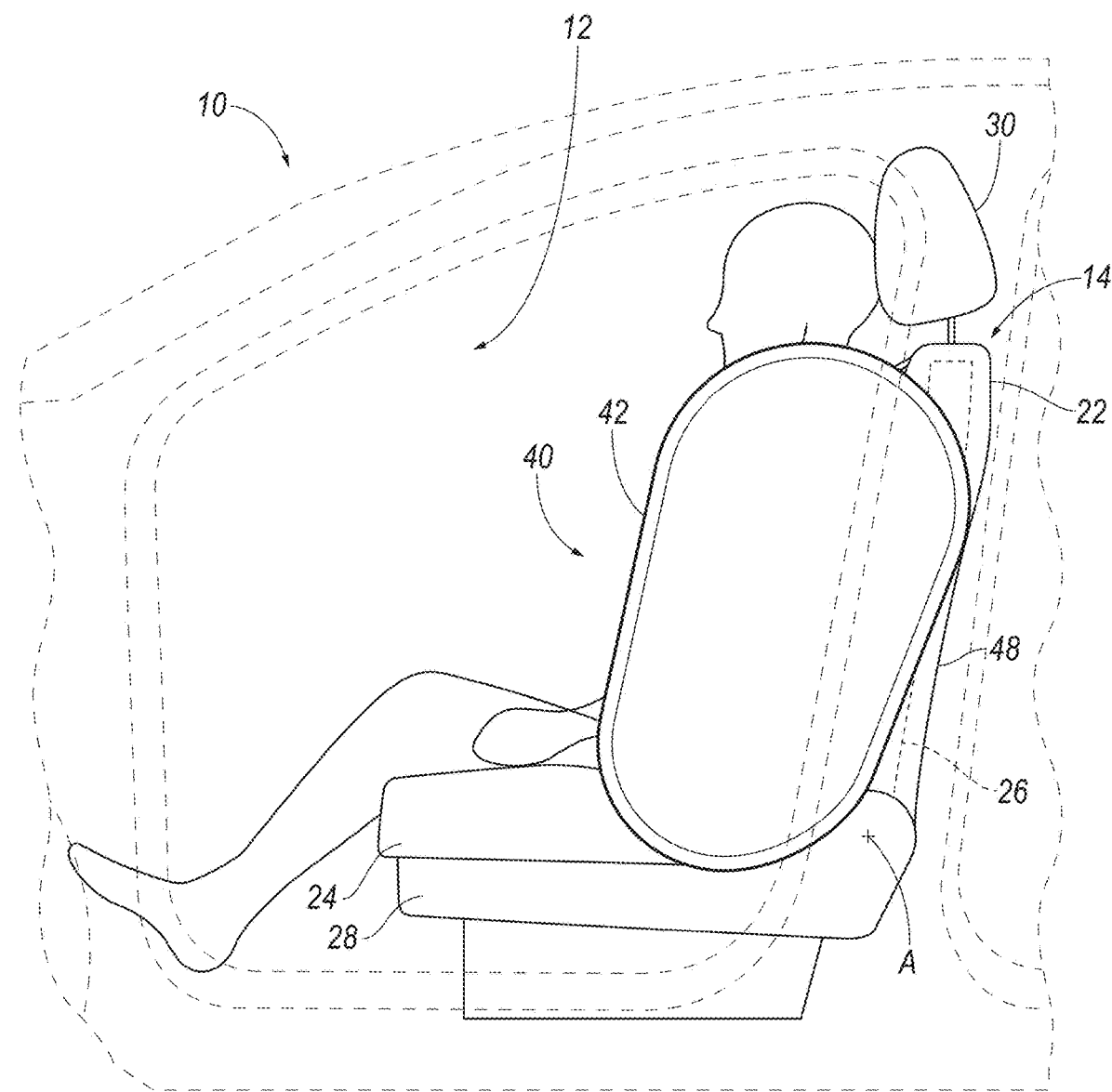
FIG. 1A is a side view of a portion of a vehicle including a seat with an airbag in an inflated position.

A seat system includes a seat moveable between an upright position and a reclined position, and an airbag module mounted to the seat. The airbag module can include an airbag inflator, an airbag, and a panel attached to a folded portion of the airbag. A tether is coupled to the folded portion via the panel, the tether being retracted relative to the airbag module when the seat is in the upright position and extended when the seat is in the reclined position.

The seat can include a seat bottom having a seat bottom frame and a seatback having a seatback frame pivotably supported by the seat bottom frame for rotation about a pivot axis.

The tether can wrap around a drum that is rotatably coupled to the seatback frame of the seat.

The drum can be coaxial with the pivot axis.

The system can include a pulley mounted to the seatback frame and positioned to guide the tether.

The drum can be rotatably coupled to the seatback frame with gears.

The gears can include a planetary gear set.

The planetary gear set can be coaxial with the pivot axis of the seat.

The airbag module can be mounted to the seatback frame.

The panel can be attached to an interior surface of the airbag.

The tether can extend through the airbag and into an interior of the airbag.

The airbag can have a first inflated configuration when the tether is retracted and a second inflated configuration when the tether is extended.

The first inflated configuration can have a first length shorter than a second length of the second inflated configuration.

The system can include a processor and a memory device storing instructions executable by the processor to activate the airbag inflator in response to certain vehicle impacts.

The seat can include a seat bottom and a seatback pivotably supported by the seat bottom wherein the tether wraps around a drum that is rotatably coupled to the seatback.

With reference to the figures, where like numerals indicate like features throughout the several views, an example of a seat system having a seat 14 moveable between an upright position (FIGS. 1A and 2) and a reclined position (FIGS. 1B and 3) and an airbag module 40 mounted to the seat 14. The airbag module 40 includes an airbag inflator 44, an airbag 42, and a panel 46 attached to a folded portion 47 of the airbag 42. A tether 50 is coupled to the panel 46. The tether 50 is retracted when the seat 14 is in the upright position and extended when the seat 14 is in the reclined position. The seat 14 can include a seat bottom 24 having a seat bottom frame 28 and a seatback 22 having a seatback frame 26 pivotably supported by the seat bottom frame 28 for rotation about a pivot axis A. The tether 50 wraps around a drum 52 that is rotatably coupled to the seatback frame 26.

With reference to FIG. 1A, the vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may define a passenger cabin 12 to house occupants, if any, of the vehicle 10. The passenger cabin 12 may extend across the vehicle 10, e.g., from a left side of the vehicle 10 to a right side of the vehicle 10. The passenger cabin 12 includes a front end and a rear end with the front end being in front of the rear end during forward movement of the vehicle 10.

One or more seats, such as seat 14, may be supported in the passenger cabin 12, e.g., by a floor of the vehicle 10. Each seat 14 includes a seatback 22 and a seat bottom 24 that can support the occupant of the seat 14. For example, the occupant of the seat 14 may sit atop a top surface of the seat bottom 24 and recline against the seatback 22. While seat 14 shown in the figures is in the front driver position, the disclosed technology can be applied to any seat in the vehicle.

The seatback 22 may include a seatback frame 26. The seatback frame 26 may include tubes, beams, etc. Specifically, the seatback frame 26 may include a pair of upright frame members. The upright frame members are elongated, and specifically, are elongated in a generally upright direction (e.g., along a seat-vertical axis) when the seatback 22 is in a generally upright position. The upright frame members are spaced apart from each other in a cross-vehicle direction. The seatback frame 26 may include one or more cross-members extending between the upright frame members.

The seat bottom 24 has a front end and a rear end. The front end is seat-forward of the rear end in the seat-forward direction. The seat bottom 24 can include a seat bottom frame 28. The frame 28 may include tubes, beams, etc. Specifically, the seat bottom frame 28 may include a pair of frame members elongated in the seat-forward direction, e.g., between the front end and the rear end of the seat bottom 24. The seat bottom frame 28 may include cross-members extending between the frame members. The seat bottom frame 28 can include a seat pan. The seat pan may be generally planar and extend from one of the frame members to the other of the frame members. The seat pan may be fixed to the frame members.

The seatback frame 26 and the seat bottom frame 28 may be of any suitable plastic material, e.g., carbon fiber reinforced plastic (CFRP), glass fiber-reinforced semi-finished thermoplastic composite (organosheet), etc. As another example, some or all components of the seatback frame 26 and the seat bottom frame 28 may be formed of a suitable metal, e.g., steel, aluminum, etc. The seatback 22 and the seat bottom 24 can include suitable covers 48. The covers 48 may include upholstery and padding. The upholstery may be cloth, leather, faux leather, or any other suitable material. The upholstery may be stitched in panels around the frames. The padding may be between the upholstery and the frames. The padding may be foam or any other suitable material.

The seatback 22 is supported by the seat bottom 24 at the rear end. The seat bottom 24 extends from the seatback 22 in the seat-forward direction of the seat 14. The rear end is proximate to the seatback 22 and the front end is distal from the seatback 22. The seatback 22 may be movable relative to the seat bottom 24. In an example, the seatback 22 is pivotably supported by the seat bottom 24 and may be selectively pivotable to a desired position by an occupant of the seat 14. In such an example, the seatback 22 is pivotable with respect to the seat bottom 24 about a pivot axis A. The seatback 22 and the seat bottom 24 may be adjustable in multiple degrees of freedom. Specifically, the seatback 22 and the seat bottom 24 may themselves be adjustable, in other words, adjustable components within the seatback 22 and/or the seat bottom 24, and/or may be adjustable relative to each other. The seatback 22 may be selectively pivotable about the pivot axis A and selectively locked in position relative to the pivot axis A with any suitable mechanism, including mechanical and/or electronic components, and in some examples, including currently known mechanisms.

The seat 14 may include a head restraint 30. The head restraint 30 may be supported by the seatback 22. The head restraint 30 may be at a top end of the seatback 22. The head restraint 30 may be stationary or movable relative to the seatback 22. The seatback 22 and the head restraint 30 may be adjustable in multiple degrees of freedom. Specifically, the seatback 22 and/or the head restraint 30 may themselves be adjustable and/or may be adjustable relative to each other. A seatbelt assembly 32 is associated with each seat 14. The seatbelt assembly 32 can include a retractor and a webbing. The webbing is retractably payable from the retractor. The seatbelt assembly may include an anchor fixed to the webbing and a latch plate that engages a buckle. Operations, systems, and methods described herein should always be implemented and/or performed in accordance with an applicable owner's/user's manual and/or safety guidelines.

As shown in FIG. 1A, the seatback 22 can carry a side airbag module 40 mounted to the seatback frame 26, for example. The airbag module 40 can include an airbag 42 and an inflator 44. In some examples, the inflator 44 can be mounted remotely. The airbag module 40 may be concealed by the covering 48, e.g., the upholstery of the seatback 22. In other words, the airbag module 40 may be between the frame 26 of the seat 14 and the upholstery of the seat 14. The covering 48 may include a tear seam (not numbered) associated with the airbag module 40. The airbag 42 may extend through the tear seam as it is deployed. The tear seam may be designed to tear apart when subjected to a tensile force above a threshold magnitude. In other words, the covering 48 on one side of the tear seam separates from the covering 48 on the other side of the tear seam when the force is above the threshold magnitude. The threshold magnitude may be chosen to be greater than forces from, e.g., inadvertent pushing against the seat by an occupant but be less than forces from the deployment of the airbag 42. The tear seam may be, for example, a line of perforations through the covering 48, a line of thinner covering material than the rest of the covering 48, etc.

The airbag 42 may be of any suitable airbag material, e.g., from a woven polymer. For example, the airbag 42 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The airbag 42 may be a single continuous unit, e.g., a single piece of fabric. Alternatively, the airbag 42 may include a plurality of segments, i.e., two or more. The segments may be attached to each other in any suitable fashion, e.g., a plurality of panels attached by stitching, ultrasonic welding, etc.

Figure 1B:
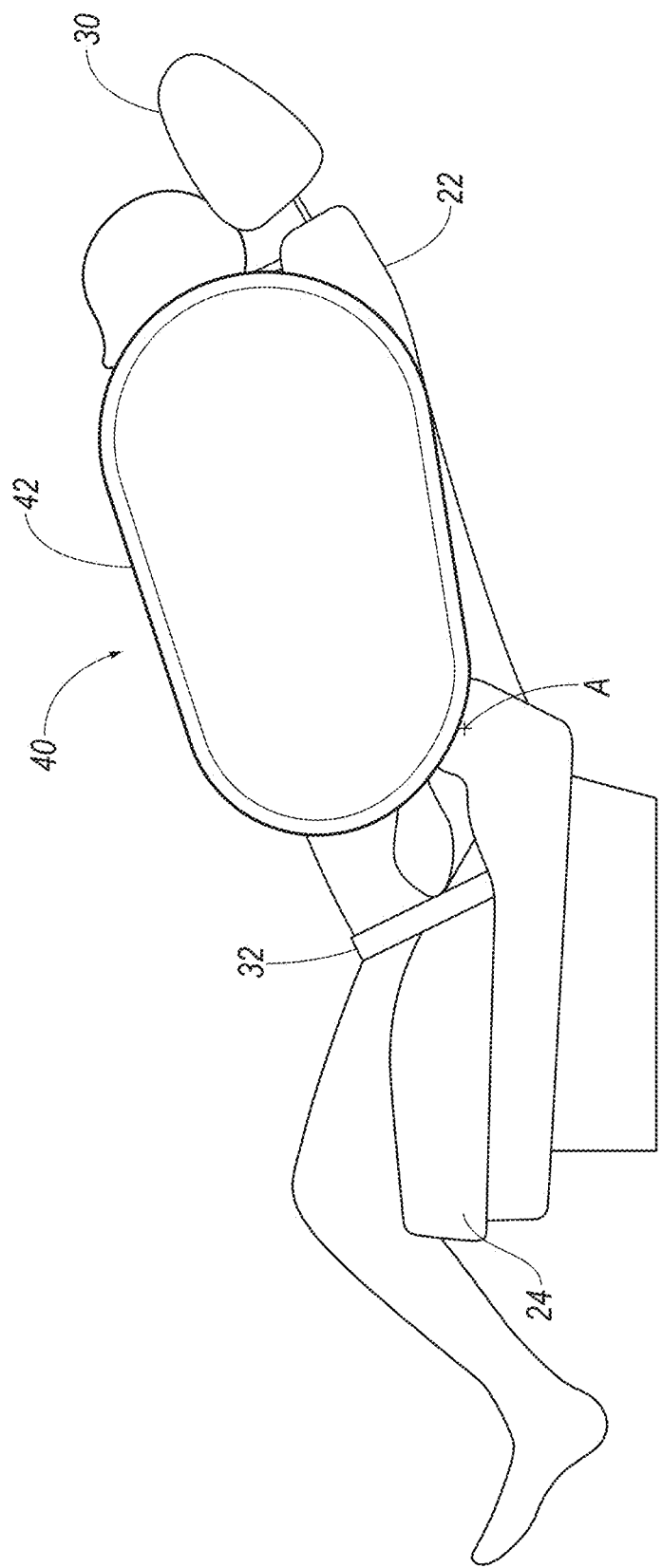
FIG. 1B is a side view of the seat in a reclined position and the airbag in the inflated position.

The airbag module 40 may be mounted to a lateral side, e.g., an outboard side, of the seatback frame 26 of the seatback 22. The airbag 42 is inflatable from an uninflated position inside the covering 48, to an inflated position extending outward and forward from the seatback 22, as shown in FIGS. 1A and 1B. The airbag 42 in the inflated position is positioned laterally from an occupant sitting in the vehicle seat 14, e.g., between the occupant seating area and a door of the vehicle 10 in a cross-vehicle direction.

In response to certain vehicle impacts the airbag 42 inflates relative to an occupant seating area of the seat 14. The occupant seating-area is the space occupied by an occupant properly seated on the seat. The occupant-seating area is vehicle-forward of the seatback 22 and above and vehicle-forward of the seat bottom 24. For example, the seat bottom 24 defines an occupant leg area and the seatback 22 defines an occupant torso area. The inflator 44 expands the airbag 42 with inflation medium, such as a gas, to move the airbag 42 from the uninflated position to the inflated position. The inflator 44 may be, for example, a pyrotechnic inflator that ignites a chemical reaction to generate the inflation medium, a stored gas inflator that releases e.g., by a pyrotechnic valve stored gas as the inflation medium, or a hybrid.

As shown in FIG. 1B, as the seatback 22 is reclined, a gap between the seatback 22 and seat bottom 24 varies in size. As such, there is an opportunity to design a side airbag that varies in size and/or configuration as the seatback 22 is reclined.

Figure 2A:
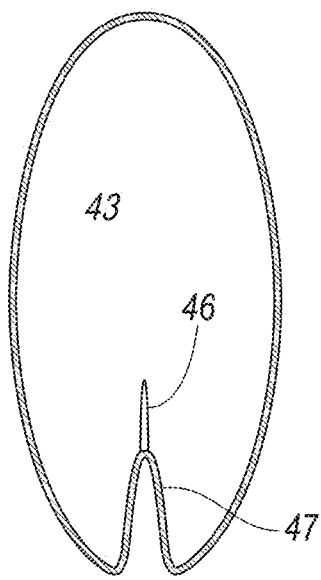
FIG. 2A is a cross-sectional view of the airbag taken along line 2A in FIG. 2.
Figure 2:
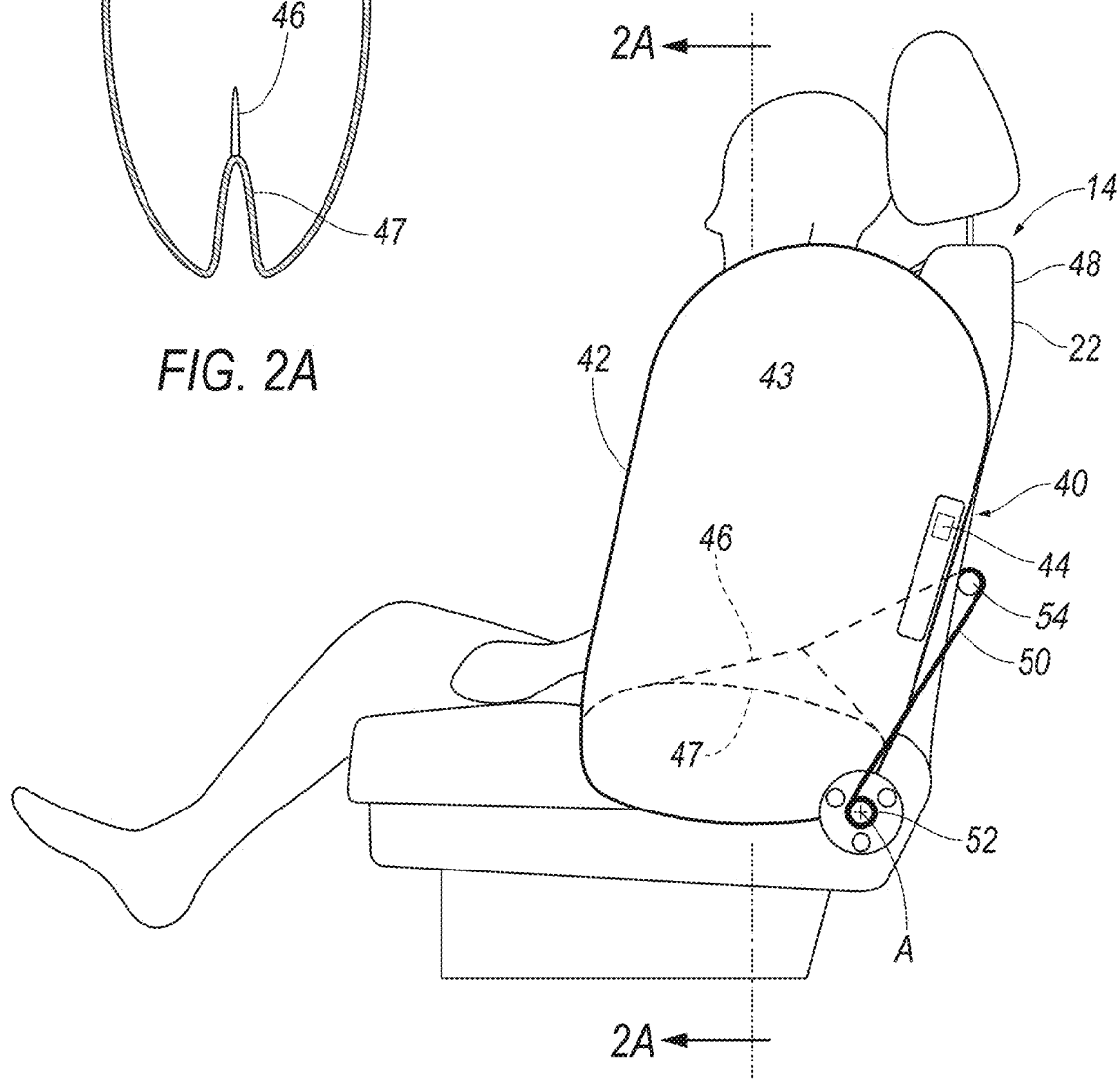
FIG. 2 is a side view of a system including a seat in an upright position with an airbag in a first inflated configuration.

With reference to FIGS. 2 and 2A, the seat 14 includes the airbag module 40 mounted to the seat 14. The airbag module 40 includes the airbag 42 and the inflator 44. The airbag 42 includes a folded portion 47 that is retained in the folded position while the seatback 22 is in the upright position. The tether 50 extends through the airbag 42 and into an interior 43 (i.e., the inflation chamber) of the airbag 42. The tether 50 is attached to a panel 46 that is in turn attached to an interior surface of the airbag 42. When the seatback 22 is in the upright position, the tether 50 is retracted thereby limiting how far the airbag 42 expands upon inflation. The tether 50 pulls the panel 46 against the inflation pressure caused by the inflator 44 to maintain the folded portion 47 in the folded position. A pulley 54 can be mounted to the seatback frame 26 and positioned to guide the tether 50 such that the tether 50 pulls upward on the panel 46. In an example, the tether 50 can enter the airbag interior 43 proximate the module 40 through a small slit (not shown).

With further reference to FIGS. 3 and 3A, the tether 50 is extendable and retractable in response to movement of the seat 14 between the upright position and the reclined position. In other words, the tether 50 extends and retracts when the seatback 22 reclines with respect to the seat bottom 24. Specifically, the tether 50 winds or wraps around the drum 52 when the tether 50 retracts, while the tether 50 unwinds or unwraps from the drum 52 when the tether 50 extends. When the seatback 22 is in the fully reclined position as shown in FIG. 3, the tether 50 is fully extended to allow the folded portion 47 of the airbag 42 to move to an unfolded position such that the airbag 42 can fully expand. As the gap between the seatback 22 and seat bottom 24 increases in size as the seatback 22 is reclined, the airbag 42 also increases in size, length, and/or changes configuration to cover the gap. Thus, the airbag 42 has a first inflated configuration (FIG. 2) when the tether 50 is retracted and a second inflated configuration (FIG. 3) when the tether 50 is extended. The first inflated configuration has a first length shorter than a second length of the second inflated configuration.

Figure 4A:
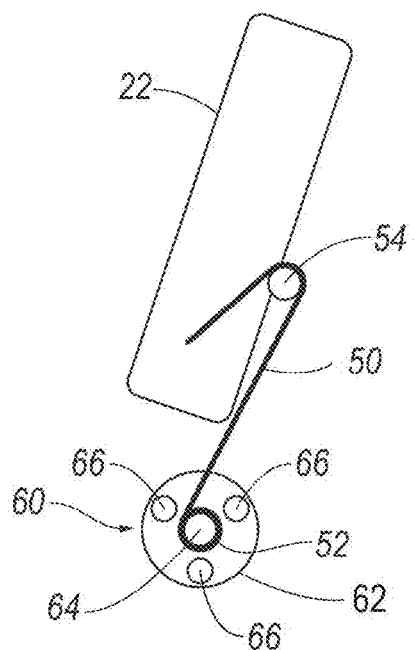
FIG. 4A is a schematic side view of the tether and drum arrangement with the tether wrapped around the drum in a retracted configuration.
Figure 4B:
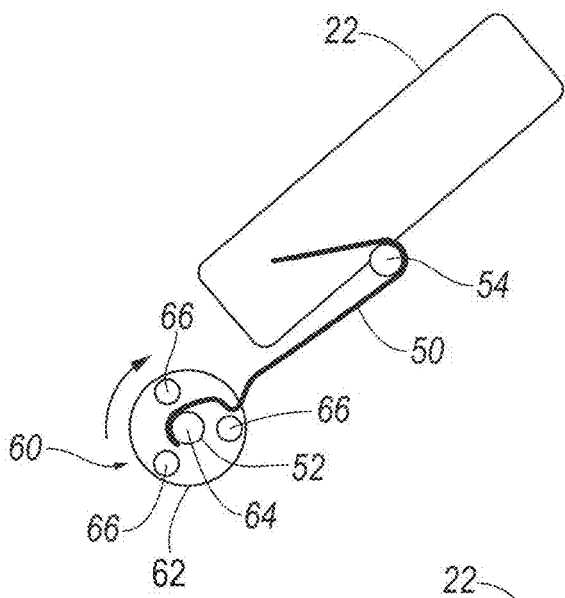
FIG. 4B is a schematic side view of the tether and drum arrangement with the tether partially wrapped around the drum.
Figure 4C:
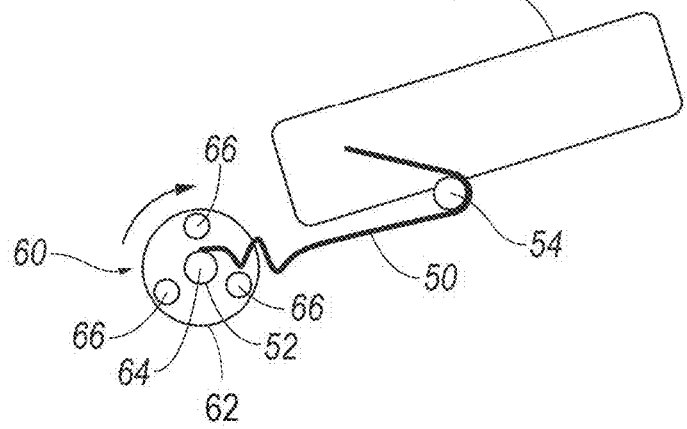
FIG. 4C is a schematic side view of the tether and drum arrangement with the tether unwrapped from the drum in an extended configuration.

With reference to FIGS. 4A-4C, the drum 52 can be rotatably coupled to the seatback frame 26 such that the drum 52 rotates in response to movement of the seatback 22 about the pivot axis A. The drum 52 can be coaxial with the pivot axis A. In an example, the drum 52 can be rotatably coupled to the seatback frame 26 with gears, such as for example, a planetary gear set 60. The planetary gear set 60 can be coaxial with both the pivot axis A of the seat 14 and the drum 52. In some examples, the drum 52 can be offset from the pivot axis A and coupled to the seatback 22 with a pair of gears (not shown). In an example, the ratio of the gears is selected to cause the drum 52 to rotate faster than the seatback 22.

In an example, the ring gear 62 of the planetary gear set 60 can be fixed to the seat bottom frame 28 while a carrier of the planetary gears 66 is coupled to the seatback frame 26 and the sun gear 64 is coupled to the drum 52. As such, the drum 52 rotates faster than and in the same direction as the seatback 22 rotation. In an example, a gear ratio of 10 to 1 can be selected such that a 36 degree change in the seatback 22 results in the drum 52 rotating 360 degrees or one revolution. The diameter of the drum 52 can be selected such that one revolution of the drum 52 pays out the length of tether 50 necessary to allow the airbag 42 to expand to the second inflated configuration (FIG. 3). Although a particular gear configuration is described as an example, any suitable gear arrangement, gear ratio, and/or drum diameter can be used.

Figure 5:
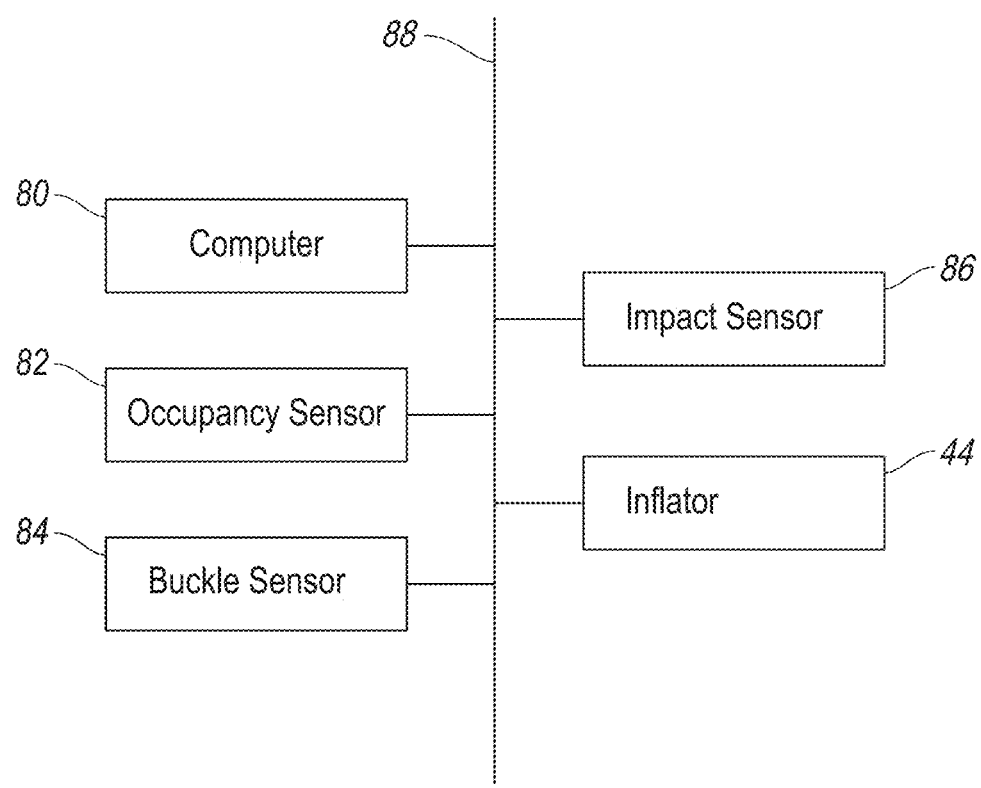
FIG. 5 is a block diagram of a system of the vehicle.

With reference to FIG. 5, a system can include a seat 14 and the side airbag module 40, as well as a computer 80, a network 88, and various sensors, including an occupancy sensor 82, a buckle sensor 84, and an impact sensor 86. The vehicle 10 may include an occupancy sensor 82 configured to detect occupancy of the seat 14. The occupancy sensor 82 may include visible-light or infrared cameras directed at the seat, weight sensors supported by the seat bottom 24, or other suitable structure, including those conventionally known. The occupancy sensor 82 provides data to the computer 80 indicating whether the seat 14 is occupied or unoccupied.

The vehicle 10 may include a buckle sensor 84 that detects engagement of the latch plate of the seatbelt assembly 32 with the buckle. The buckle sensor 84 may include a switch, a contact sensor, a hall effect sensor, or any other suitable structure for detecting engagement of the latch plate with the buckle, including conventional structures. The buckle sensor 84 provides data to the computer 80 indicating whether the latch plate is engaged with, or disengaged from, the buckle.

The vehicle 10 may include at least one impact sensor 86 for sensing certain vehicle impacts (e.g., impacts of a certain magnitude, direction, etc.). The vehicle computer 80 may activate the inflator 44 to inflate the airbag 42, e.g., provide an impulse to a pyrotechnic charge, when the impact sensor 86 senses certain vehicle impacts. Alternatively or additionally to sensing certain vehicle impacts, the impact sensor 86 may be configured to sense certain vehicle impacts prior to impact, i.e., pre-impact sensing.

The impact sensor 86 is configured to detect certain vehicle impacts. In other words, a "certain vehicle impact" is an impact of the type and/or magnitude for which activation of the airbag 42 is designed i.e., "certain" indicates the type and/or magnitude of the impact. The type and/or magnitude of such "certain vehicle impacts" may be pre-stored in the computer 80, e.g., a restraints control module and/or a body control module. The impact sensor 86 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 86 may be located at numerous points in or on the vehicle 10.

The vehicle 10 may include a communication network 88. The communication network 88 includes hardware, such as a communication bus, for facilitating communication among vehicle components, e.g., the computer 80, the occupancy sensor 82, the buckle sensor 84, the impact sensor 86, an inflator 44, etc. The communication network 88 may facilitate wired or wireless communication among the vehicle components in accordance with a number of communication protocols such as controller area network (CAN), Ethernet, Wi-Fi, Local Interconnect Network (LIN), and/or other wired or wireless mechanisms. Alternatively or additionally, in cases where the computer 80 comprises a plurality of devices, the communication network 88 may be used for communications between devices represented as the computer 80 in this disclosure.

The computer 80 may be a microprocessor-based computer implemented via circuits, chips, or other electronic components. The computer 80 includes a processor, a memory, etc. The memory of the computer 80 may include memory for storing programming instructions executable by the processor as well as for electronically storing data and/or databases. For example, the computer 80 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 80 may be a restraints control module. In another example, computer 80 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 80. The memory can be of any type, e.g., hard disk drives, solid state drives, servers, or any volatile or non-volatile media. The memory can store the collected data sent from the sensors.

The computer 80 is programmed to, i.e., the memory stores instructions executable by the processor to inflate the airbag 42 to the inflated position by sending a signal to the inflator 44 to move the airbag 42 to the deployed/inflated position. The computer 80 may be programmed to deploy the airbag 42 in response to detecting certain vehicle impacts. The computer 80 may determine that a certain vehicle impact has occurred or may occur based on information received from the impact sensor 86 via the communication network 88.

The computer 80 may determine that the seat 14 is occupied based on information received from the occupancy sensor 82 via the communication network 88. In an example, the computer 80 may be programmed to deploy the airbag 42 in response to detecting certain vehicle impacts and when the computer 80 has determined that the seat 14 is occupied.

The computer 80 may determine that the latch plate of the seatbelt assembly 32 is engaged with the buckle based on information received from the buckle sensor 84 via the communication network 88. In an example, the computer 80 may be programmed to deploy the airbag 42 in response to detecting certain vehicle impacts and when the computer 80 has determined that the latch plate is engaged with the buckle.

The computer 80 may determine that the seat 14 is occupied and that the latch plate of the seatbelt assembly 32 is engaged with the buckle. In another example, the computer 80 may be programmed to deploy the airbag 42 in response to detecting certain vehicle impacts and when the computer 80 has determined that the seat 14 is occupied and the latch plate is engaged with the buckle.

Computing devices, such as the computer 80, generally include computer-executable instructions, where the instructions may be executable by one or more computing devices such as those listed above. Computer-executable instructions may be compiled or interpreted from computer programs created using a variety of programming languages and/or technologies. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

The numerical adjectives first, second, etc., are used throughout this document as identifiers and do not signify importance, order, or quantity.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   a seat moveable between an upright position and a reclined position;
   an airbag module mounted to the seat, including:
     an airbag inflator;
     an airbag; and
     a panel attached to a folded portion of the airbag; and
   a tether coupled to the folded portion via the panel, the tether being retracted relative to the airbag module when the seat is in the upright position and extended when the seat is in the reclined position.

2. The system of claim 1, wherein the seat includes a seat bottom having a seat bottom frame and a seatback having a seatback frame pivotably supported by the seat bottom frame for rotation about a pivot axis.

3. The system of claim 2, wherein the tether wraps around a drum that is rotatably coupled to the seatback frame.

4. The system of claim 3, wherein the drum is coaxial with the pivot axis.

5. The system of claim 4, further comprising a pulley mounted to the seatback frame and positioned to guide the tether.

6. The system of claim 3, wherein the drum is rotatably coupled to the seatback frame with gears.

7. The system of claim 6, wherein the gears include a planetary gear set.

8. The system of claim 7, wherein the planetary gear set is coaxial with the pivot axis of the seat.

9. The system of claim 2, wherein the airbag module is mounted to the seatback frame.

10. The system of claim 1, wherein the panel is attached to an interior surface of the airbag.

11. The system of claim 10, wherein the tether extends through the airbag and into an interior of the airbag.

12. The system of claim 1, wherein the airbag has a first inflated configuration when the tether is retracted and a second inflated configuration when the tether is extended.

13. The system of claim 12, wherein the first inflated configuration has a first length shorter than a second length of the second inflated configuration.

14. The system of claim 1, further comprising a processor and a memory device storing instructions executable by the processor to activate the airbag inflator in response to certain vehicle impacts.

15. The system of claim 14, wherein the seat includes a seat bottom and a seatback pivotably supported by the seat bottom wherein the tether wraps around a drum that is rotatably coupled to the seatback.

16. The system of claim 15, further comprising a pulley mounted to the seatback and positioned to guide the tether.

17. The system of claim 14, wherein the panel is attached to an interior surface of the airbag.

18. The system of claim 17, wherein the tether extends through the airbag and into an interior of the airbag.

19. The system of claim 14, wherein the airbag has a first inflated configuration when the tether is retracted and a second inflated configuration when the tether is extended.

20. The system of claim 19, wherein the first inflated configuration has a first length shorter than a second length of the second inflated configuration.

\* \* \* \* \*